United States Patent
Li et al.

(10) Patent No.: US 11,462,098 B2
(45) Date of Patent: Oct. 4, 2022

(54) INFRARED LIGHT TRANSMIT APPARATUS AND MOBILE TERMINAL

(71) Applicant: Honor Device Co., Ltd., Shenzhen (CN)

(72) Inventors: Ruifeng Li, Beijing (CN); Chenlong Li, Beijing (CN); Jian Xie, Shenzhen (CN); Lipeng Qi, Beijing (CN)

(73) Assignee: Honor Device Co., Ltd., Shenzhen (CN)

( * ) Notice: Subject to any disclaimer, the term of this patent is extended or adjusted under 35 U.S.C. 154(b) by 957 days.

(21) Appl. No.: 16/312,609

(22) PCT Filed: Jun. 23, 2016

(86) PCT No.: PCT/CN2016/086888
§ 371 (c)(1),
(2) Date: Dec. 21, 2018

(87) PCT Pub. No.: WO2017/219316
PCT Pub. Date: Dec. 28, 2017

(65) Prior Publication Data
US 2019/0333368 A1 Oct. 31, 2019

(51) Int. Cl.
*G08C 23/04* (2006.01)
*G02B 19/00* (2006.01)

(52) U.S. Cl.
CPC ........... *G08C 23/04* (2013.01); *G02B 19/009* (2013.01)

(58) Field of Classification Search
CPC ......... G08C 23/04; G02B 19/009; G02B 6/00
See application file for complete search history.

(56) References Cited

U.S. PATENT DOCUMENTS

2015/0043245 A1* 2/2015 Katoh .................. F21V 19/002
362/362

FOREIGN PATENT DOCUMENTS

| CA | 2545124 A1 | 4/2006 |
|---|---|---|
| CN | 2831294 Y | 10/2006 |
| CN | 201129669 Y | 10/2008 |
| CN | 102375238 A | 3/2012 |
| CN | 202178725 U | 3/2012 |

(Continued)

*Primary Examiner* — David E Smith
(74) *Attorney, Agent, or Firm* — Slater Matsil, LLP (57) ABSTRACT

This application discloses an infrared light transmit apparatus and a mobile terminal in which the infrared light transmit apparatus is applied. The infrared light transmit apparatus includes an infrared light transmitter and a light cover, where the light cover includes a fixing post and a positioning station that are connected to each other; the fixing post includes a light-in surface and a light-out surface that are disposed opposite to each other and includes a side surface connecting the light-in surface and the light-out surface, the light-in surface is connected to the positioning station, the light-out surface is away from the positioning station, and the side surface is configured to fit a housing of the mobile terminal, so that the light cover is fastened to the housing; and a light concentration surface is formed on a side that is of the positioning station and that is away from the fixing post, the light concentration surface includes a concave curved surface, the light concentration surface faces towards the infrared light transmitter to receive infrared light transmitted by the infrared light transmitter.

20 Claims, 5 Drawing Sheets

(56) References Cited

FOREIGN PATENT DOCUMENTS

| | | | | |
|---|---|---|---|---|
| CN | 102590925 | A | | 7/2012 |
| CN | 102590925 | A | * | 7/2012 |
| CN | 202931491 | U | | 5/2013 |
| CN | 203810278 | U | | 9/2014 |
| CN | 203810278 | U | * | 9/2014 |
| CN | 104676426 | A | * | 6/2015 |
| CN | 204650741 | U | | 9/2015 |
| CN | 105020654 | A | | 11/2015 |
| CN | 205065604 | U | | 3/2016 |
| CN | 205139410 | U | | 4/2016 |
| CN | 105572834 | A | | 5/2016 |
| JP | 11211202 | A | * | 8/1999 |
| JP | H11211202 | A | | 8/1999 |

* cited by examiner

INFRARED LIGHT TRANSMIT APPARATUS AND MOBILE TERMINAL

CROSS-REFERENCE TO RELATED APPLICATIONS

This application is a National Stage of International Application No. PCT/CN2016/086888, filed Jun. 23, 2016, which is hereby incorporated by reference in its entirety.

TECHNICAL FIELD

This application relates to the field of electronic technologies, and in particular, to an infrared light transmit apparatus and a mobile terminal.

BACKGROUND

With development of terminal technologies, a mobile terminal such as a mobile phone or a tablet computer can support an infrared remote control function, and therefore replaces a television remote control, an air conditioner remote control, a refrigerator remote control, or the like.

Currently, for most mobile terminals, an infrared light transmitter is disposed in a housing of the mobile terminal, and a light cover is disposed in a light-out direction of the infrared light transmitter. Infrared light transmitted by the infrared light transmitter passes through the light cover and is transmitted from the housing, to implement a remote control function.

However, because an existing structure of the light cover is improperly set, when the infrared light transmitted by the infrared light transmitter passes the light cover, some light fails to pass through the light cover and cannot be transmitted from the housing. Consequently, an energy loss of an infrared light signal occurs. In particular, as the market imposes a requirement for miniaturizing the mobile terminal, the light cover also needs to be smaller. Consequently, a percentage of the energy loss of the infrared light signal rises, and an infrared remote control capability of the mobile terminal is weak and even lost.

SUMMARY

To resolve a technical problem, implementations of this application provide an infrared light transmit apparatus having a strong remote control capability, and a mobile terminal in which the infrared light transmit apparatus is applied.

To achieve the foregoing objective, the following technical solutions are used in the implementations of this application.

According to a first aspect, an implementation of this application provides an infrared light transmit apparatus, including an infrared light transmitter and a light cover, where the light cover includes a fixing post and a positioning station that are connected to each other; the fixing post includes a light-in surface and a light-out surface that are disposed opposite to each other and includes a side surface connecting the light-in surface and the light-out surface, the light-in surface is connected to the positioning station, the light-out surface is away from the positioning station, and the side surface is configured to fit a housing of a mobile terminal, so that the light cover is fastened to the housing; and a light concentration surface is formed on a side that is of the positioning station and that is away from the fixing post, the light concentration surface includes a concave curved surface, and the light concentration surface faces towards the infrared light transmitter to receive infrared light transmitted by the infrared light transmitter.

In this implementation, because the light concentration surface is formed on the light cover, and the light concentration surface includes the concave curved surface and has a light concentration function, the infrared light transmitted by the infrared light transmitter can pass through the light concentration surface to enter the light cover and can be transmitted from the light-out surface. In other words, the infrared light can be smoothly transmitted from the housing. Therefore, an energy loss of an infrared light signal in a transmission process is very low, and a remote control capability of the infrared light transmit apparatus is strong.

In a first possible implementation, the fixing post is cylindrical and has a first central axis, the light concentration surface is centrally symmetric and has a second central axis, and the first central axis, the second central axis, and a symmetric axis of the infrared light transmitter in a light-out direction are collinear. In this way, the light concentration surface has a better light concentration effect, and the fixing post can better transmit an infrared light signal, to reduce an energy loss of the infrared light signal during transmission in the light cover.

The light-out surface is in the shape of a smooth arc-shaped surface, and therefore the light-out surface has a relatively large light-out angle.

With reference to the first possible implementation, in a second possible implementation, an area of the light concentration surface is a first area, a cross-sectional area that is of the fixing post and that is in a direction perpendicular to the first central axis is a second area, and the first area is greater than the second area.

Specifically, due to the light concentration function of the light concentration surface, light in a larger angle can be concentrated into light in a smaller angle, the infrared light transmitted by the infrared light transmitter can be smoothly transmitted from the light concentration surface with a larger area to the fixing post with a smaller cross-sectional area, and an energy loss is low. In addition, because the light concentration surface has a larger area, the light cover can receive more infrared light to ensure the remote control capability of the infrared light transmit apparatus. Further, because the fixing post has a smaller cross-sectional area, a volume of the light cover is reduced, and a volume of the housing is reduced. This meets a design requirement for miniaturizing the mobile terminal.

With reference to the first aspect, the first possible implementation of the first aspect, or the second possible implementation of the first aspect, in a third possible implementation, the light concentration surface includes a plurality of peaks with different curvatures and a plurality of valleys with different curvatures, and the plurality of peaks and the plurality of valleys are connected alternately and smoothly, to form the wavy curved surface.

In this implementation, the light concentration surface is designed to enable light entering the light concentration surface to be transmitted to the fixing post, and be transmitted from the light-out surface of the fixing post, thereby reducing an energy loss of an infrared light signal and ensuring a strong remote control capability of the infrared light transmit apparatus.

With reference to the first aspect, the first possible implementation of the first aspect, the second possible implementation of the first aspect, or the third possible implementation of the first aspect, in a fourth possible implementation, the light cover is made of acrylic material, so that the light cover can transmit invisible light.

The light cover is manufactured by using an all-in-one injection molding technology, and therefore is reliable in structure, easy to manufacture, and low-cost.

With reference to the first aspect, the first possible implementation of the first aspect, the second possible implementation of the first aspect, or the third possible implementation of the first aspect, in a fifth possible implementation, a positioning surface is formed on a side that is of the positioning station and that is close to the fixing post, and the positioning surface is disposed to encircle the fixing post to press against the housing.

With reference to the fifth possible implementation, in a sixth possible implementation, a plurality of cushions are disposed on the positioning surface, and the plurality of cushions are evenly distributed around the fixing post.

The plurality of cushions pressing against the housing may be configured to help the light cover implement positioning. In addition, with a cushioning function, the plurality of cushions can protect the light cover from damage when the mobile terminal shakes violently.

With reference to the fifth possible implementation, in a seventh possible implementation, a groove is formed in a junction between the positioning surface and the side surface, so that the light cover can be better mounted to the housing.

A draft angle is formed between the light-out surface and the side surface, to increase a light-out area of the light-out surface, reduce an energy loss of an infrared light signal, and improve a remote control capability of the infrared light transmit apparatus.

With reference to any one of the first aspect and the first to the seventh possible implementations of the first aspect, in an eighth possible implementation, the infrared light transmit apparatus further includes a drive circuit, and the drive circuit is electrically connected to the infrared light transmitter to supply power to the infrared light transmitter.

According to a second aspect, an implementation of this application further provides another mobile terminal, including the infrared light transmit apparatus in any one of the foregoing implementations. The mobile terminal has a strong remote control capability.

BRIEF DESCRIPTION OF THE DRAWINGS

To describe the technical solutions in this application more clearly, the following briefly describes the accompanying drawings required for describing the implementations. Apparently, the accompanying drawings in the following description show merely some implementations of this application, and a person of ordinary skill in the art may derive other drawings from these accompanying drawings without creative efforts.

DETAILED DESCRIPTION OF ILLUSTRATIVE EMBODIMENTS

The following clearly and completely describes the technical solutions in the implementations of this application with reference to the accompanying drawings in the implementations of this application. Apparently, the described implementations are merely some but not all of the implementations of this application. All other implementations obtained by a person of ordinary skill in the art based on the implementations of this application without creative efforts shall fall within the protection scope of this application.

Referring to FIG. 1 to FIG. 6, an implementation of this application provides an infrared light transmit apparatus 10, including an infrared light transmitter 1 and a light cover 2.

Specifically, the light cover 2 includes a fixing post 21 and a positioning station 22.

The fixing post 21 includes a light-in surface (not shown in the figure) and a light-out surface 211 that are disposed opposite to each other and includes a side surface 212 connecting the light-in surface and the light-out surface 211. The light-in surface is connected to the positioning station 22 (in this case, the light-out surface 211 is away from the positioning station 22). The side surface 212 fits a housing 20 of a mobile terminal 100, so that the light cover 2 is fastened to the housing 20.

A light concentration surface 221 is formed on a side that is of the positioning station 22 and that is away from the fixing post 21, the light concentration surface 221 includes a concave curved surface, and the light concentration surface 221 faces towards the infrared light transmitter 1 to receive infrared light transmitted by the infrared light transmitter 1.

Figure 3:
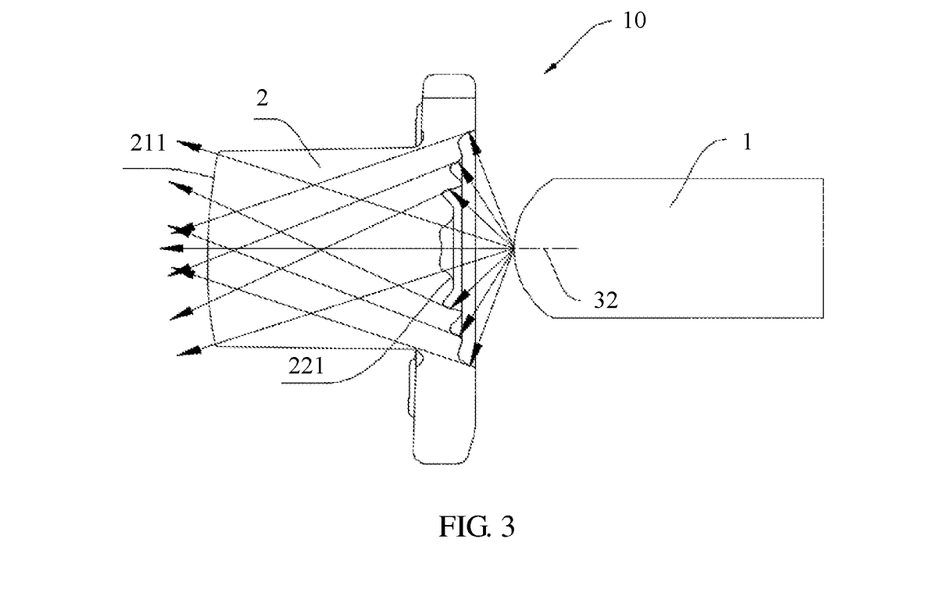
FIG. 3 is a schematic diagram of an optical path in an infrared light transmit apparatus according to an implementation of this application.
Figure 4:
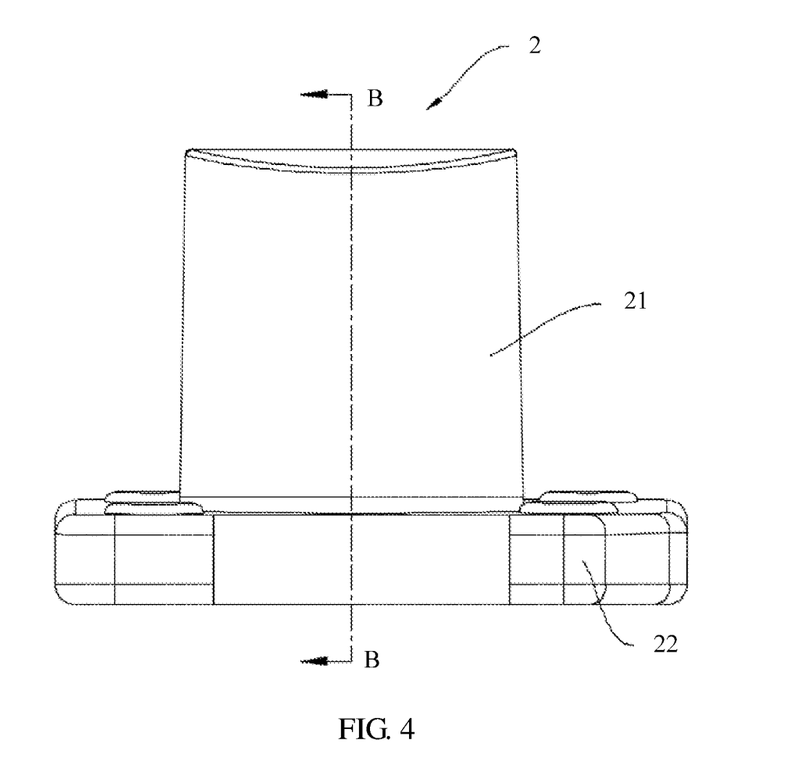
FIG. 4 is a schematic structural diagram of a light cover in an infrared light transmit apparatus according to an implementation of this application.

In this implementation, because the light concentration surface 221 is formed on the light cover 2, and the light concentration surface 221 includes the concave curved surface and has a light concentration function, the infrared light transmitted by the infrared light transmitter 1 can pass through the light concentration surface 221 to enter the light cover 2 and can be transmitted from the light-out surface 211 (an optical path shown in FIG. 3). In other words, the infrared light can be smoothly transmitted from the housing 20. Therefore, an energy loss of an infrared light signal in a transmission process is very low, and a remote control capability of the infrared light transmit apparatus 10 is strong.

It should be understood that the "concave curved surface" indicates that a middle part of the curved surface is curved into the positioning station 22 relative to an edge of the curved surface. In an optional implementation, the light concentration surface 221 includes only the curved surface, and therefore the curved surface is a surface denoted by 221.

Figure 5:
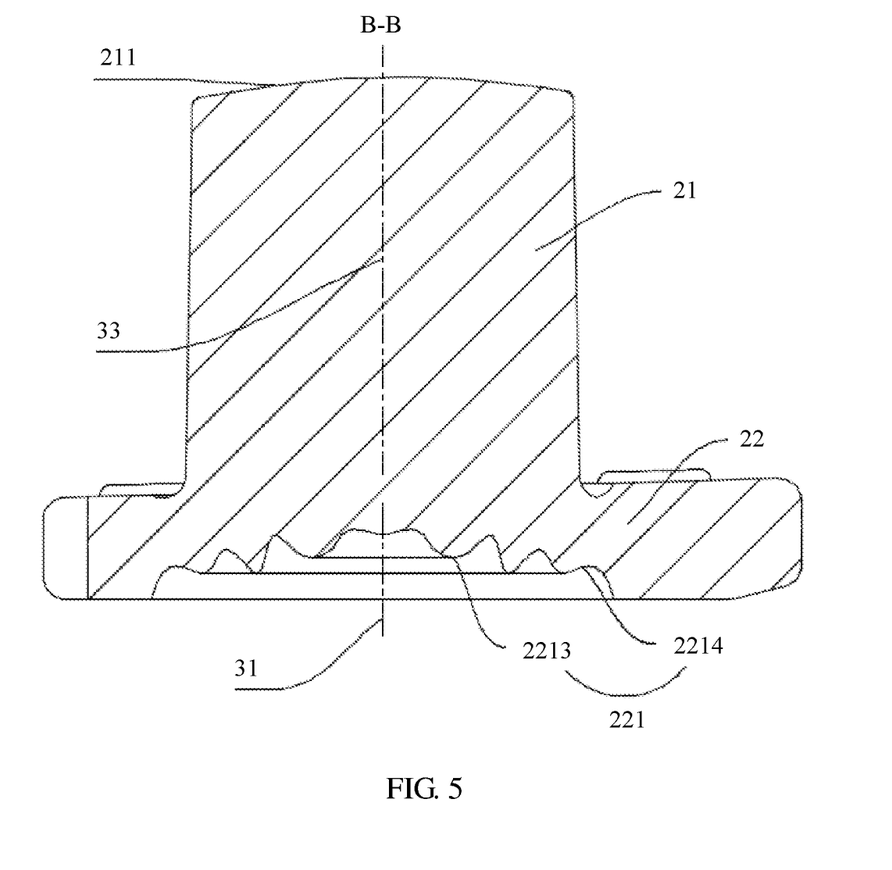
FIG. 5 is a sectional view of a structure in a B-B position in FIG. 4.

Further, referring to FIG. 3 and FIG. 5, in a preferred implementation, the fixing post 21 is cylindrical and has a first central axis 33, the light concentration surface 221 is centrally symmetric and has a second central axis 31, and the first central axis 33, the second central axis 31, and a symmetric axis 32 of the infrared light transmitter 1 in a light-out direction are collinear. In this way, the light concentration surface 221 has a better light concentration effect, and the circular fixing post 21 can better transmit an infrared light signal, to reduce an energy loss of the infrared light signal during transmission in the light cover 2.

It can be understood that in another implementation, when the symmetric axis 32 is eccentrically disposed relative to the light concentration surface 221, the light concentration surface 221 is no longer centrally symmetric, and a wave on the light concentration surface 221 extends from an eccentric point (not shown in the figure) on the light concentration surface 221 to an edge of the light concentration surface 221, and the eccentric point faces towards the symmetric axis 32, so that the light concentration surface 221 also has a better light concentration effect.

Further, referring to FIG. 1 to FIG. 6, a shape of the light-out surface 211 is designed to fit a surface shape of the housing 20, for example, a smooth arc-shaped surface, so that a light-out angle of the light-out surface 211 is relatively large.

Further, referring to FIG. 1 to FIG. 3 and FIG. 5, in a preferred implementation, an area of the light concentration surface 221 is a first area, a cross-sectional area that is of the fixing post 21 and that is in a direction perpendicular to the first central axis 33 is a second area, and the first area is greater than the second area. In this case, due to the light concentration function of the light concentration surface 221, light in a larger angle can be concentrated into light in a smaller angle, the infrared light transmitted by the infrared light transmitter 1 can be smoothly transmitted from the light concentration surface 221 with a larger area to the fixing post 21 with a smaller cross-sectional area, and an energy loss is low. In addition, because the light concentration surface 221 has a larger area, the light cover 2 can receive more infrared light to ensure the remote control capability of the infrared light transmit apparatus 10. Further, because the fixing post 21 has a smaller cross-sectional area, a volume of the light cover 2 is reduced, and a volume of the housing 20 is reduced. This meets a design requirement for miniaturizing the mobile terminal 100.

It should be noted that the area of the light concentration surface 221 indicates an area of a region encircled by edges of the light concentration surface 221.

Further, referring to FIG. 3 and FIG. 5, in a preferred implementation, the curved surface of the light concentration surface 221 is wavy. Specifically, the light concentration surface 221 includes a plurality of peaks 2213 with different curvatures and a plurality of valleys 2214 with different curvatures, and the plurality of peaks 2213 and the plurality of valleys 2214 are connected alternately and smoothly, to form the wavy curved surface. When the light concentration surface 221 is centrally symmetric, a wave extends from a center (to be specific, an intersecting point between the second central axis 31 and the light concentration surface 221) of the light concentration surface 221 to an edge of the light concentration surface 221. In this implementation, the light concentration surface 221 is designed to enable light entering the light concentration surface 221 to be transmitted to the fixing post 21, and be transmitted from the light-out surface 211 of the fixing post 21, thereby reducing an energy loss of an infrared light signal and ensuring a strong remote control capability of the infrared light transmit apparatus 10.

Further, in a preferred implementation, the light cover 2 is made of acrylic (also referred to as PMMA or plexiglass, sourced from acrylic (acrylic plastics) in English, and referred to polymethyl methacrylate in chemistry) material, and is configured to transmit invisible infrared light. The light cover 2 uses an all-in-one injection molding technology, and therefore is reliable in structure, easy to manufacture, and low-cost.

It should be understood that when the infrared light transmitter 1 is another invisible-light transmitter, the light cover 2 in this implementation may also be configured to transmit other invisible light.

Further, referring to FIG. 1 to FIG. 6, in a preferred implementation, a positioning surface 222 is formed on a side that is of the positioning station 22 and that is close to the fixing post 21, and the positioning surface 222 is disposed to encircle the fixing post 21 to press against the housing 20. The positioning surface 222 may be configured to help the light cover 2 implement positioning.

Further, referring to FIG. 1 to FIG. 6, in a preferred implementation, a plurality of cushions 223 are disposed on the positioning surface 222, and the plurality of cushions 223 are evenly distributed around the fixing post 21. The plurality of cushions 223 pressing against the housing 20 may be configured to help the light cover 2 implement positioning. In addition, with a cushioning function, the plurality of cushions 223 can protect the light cover 2 from damage when the mobile terminal 100 shakes violently.

Figure 2:
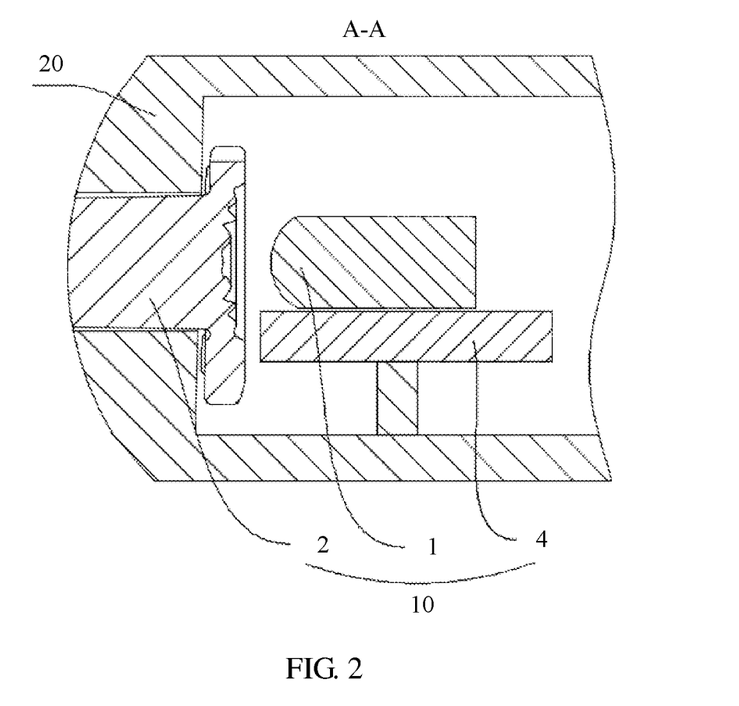
FIG. 2 is a sectional view of a structure in an A-A position in FIG. 1.
Figure 6:
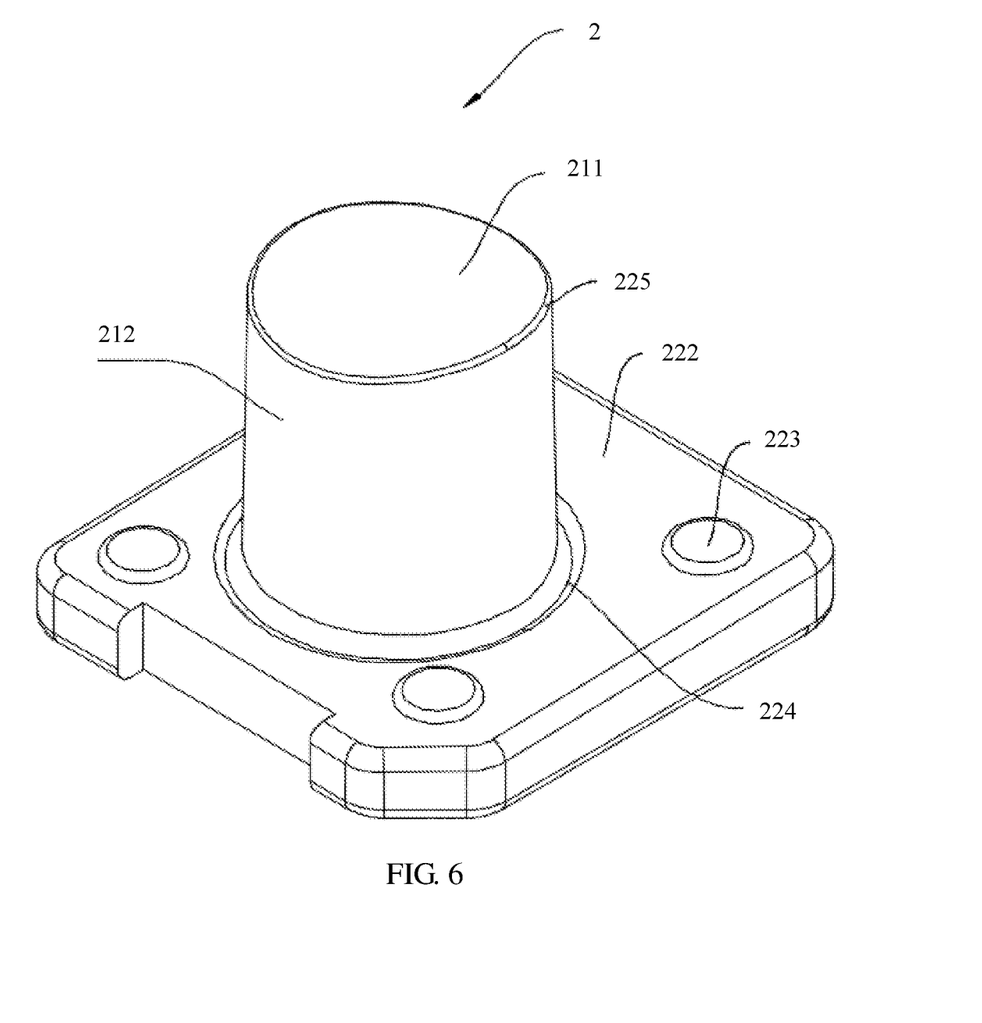
FIG. 6 is a schematic three-dimensional diagram of a light cover in an infrared light transmit apparatus according to an implementation of this application.

Further, referring to FIG. 2 and FIG. 6, in a preferred implementation, a groove 224 is formed in a junction between the positioning surface 222 and the side surface 212. In other words, an undercut design is provided in the junction between the positioning surface 222 and the side surface 212, so that the light cover 2 can be better mounted to the housing 20.

Further, referring to FIG. 2, FIG. 3, and FIG. 6, in a preferred implementation, a draft angle 225 is formed between the light-out surface 211 and the side surface 212, to increase an area of the light-out surface 211, reduce an energy loss of an infrared light signal, and improve a remote control capability of the infrared light transmit apparatus 10.

Figure 1:
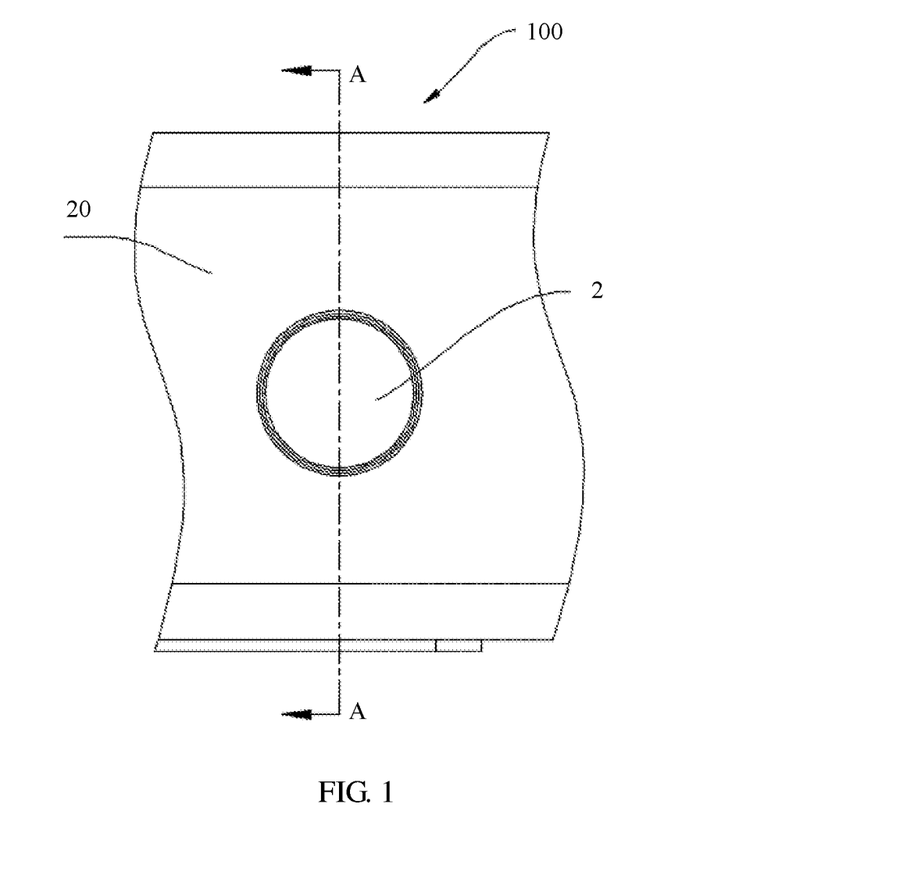
FIG. 1 is a schematic structural diagram of a mobile terminal according to an implementation of this application.

Further, referring to FIG. 1 to FIG. 3, in a preferred implementation, the infrared light transmit apparatus 10 further includes a printed circuit board 4, the printed circuit board 4 is disposed with a drive circuit, and the drive circuit is electrically connected to the infrared light transmitter 1 to supply power to the infrared light transmitter 1.

Referring to FIG. 1 to FIG. 6, an implementation of this application further provides a mobile terminal 100, including the infrared light transmit apparatus 10 and the housing 20 in any one of the foregoing implementations. The mobile terminal 100 has a strong remote control capability.

The mobile terminal wo includes but is not limited to a mobile phone, a notebook computer, a tablet computer, a POS machine, a vehicle-mounted computer, a camera, and the like.

The implementations of this application are described in detail above. The principle and implementation of this application are described herein by using specific examples. The description about the implementations is merely provided to help understand the method and core ideas of this application. In addition, a person of ordinary skill in the art can make modifications to this application in terms of the specific implementations and application scopes according to the ideas of this application. Therefore, the content of this specification shall not be construed as a limitation to this application.

What is claimed is:

1. An infrared light transmit apparatus comprising:
an infrared light transmitter; and
a light cover comprising a fixing post and a positioning station that are connected to each other, wherein the fixing post comprises a light-in surface and a light-out surface that are disposed opposite to each other and comprises a side surface connecting the light-in surface and the light-out surface, the light-in surface is connected to the positioning station, and the side surface is configured to fit a housing of a mobile terminal; and a light concentration surface disposed on a side of the positioning station and facing towards the infrared light transmitter to receive infrared light transmitted by the infrared light transmitter, the light concentration surface comprising a concave curved surface that is optically coupled to the light-in surface, the concave curved surface comprising a middle part of the concave curved surface that is curved into the positioning station toward the infrared light transmitter relative to an edge of the concave curved surface, the light-out surface being a smooth arc-shaped surface that is convex in a direction from the positioning station to the fixing post.

2. The infrared light transmit apparatus according to claim 1, wherein the fixing post is cylindrical and has a first central axis, the light concentration surface is centrally symmetric and has a second central axis, and the first central axis, the second central axis, and a symmetric axis of the infrared light transmitter in a light-out direction are collinear.

3. The infrared light transmit apparatus according to claim 2, wherein an area of the light concentration surface is a first area, a cross-sectional area that is of the fixing post and that is in a direction perpendicular to the first central axis is a second area, and the first area is greater than the second area.

4. The infrared light transmit apparatus according to claim 1, wherein the light concentration surface comprises a plurality of peaks with different curvatures and a plurality of valleys with different curvatures, and the plurality of peaks and the plurality of valleys are connected alternately and smoothly, to form a wavy curved surface.

5. The infrared light transmit apparatus according to claim 1, wherein the light cover is made of acrylic material.

6. The infrared light transmit apparatus according to claim 1, wherein a positioning surface is formed on a side that is of the positioning station and that is close to the fixing post, and the positioning surface is disposed to encircle the fixing post to press against the housing.

7. The infrared light transmit apparatus according to claim 6, wherein a plurality of cushions are disposed on the positioning surface, and the plurality of cushions are evenly distributed around the fixing post.

8. The infrared light transmit apparatus according to claim 6, wherein a groove is formed in a junction between the positioning surface and the side surface.

9. The infrared light transmit apparatus according to claim 1, wherein the infrared light transmit apparatus further comprises a drive circuit, and the drive circuit is electrically connected to the infrared light transmitter to supply power to the infrared light transmitter.

10. A mobile terminal comprising:
an infrared light transmit apparatus, wherein the infrared light transmit apparatus comprises an infrared light transmitter and a light cover, wherein the light cover comprises a fixing post and a positioning station that are connected to each other, wherein the fixing post comprises a light-in surface and a light-out surface that are disposed opposite to each other and comprises a side surface connecting the light-in surface and the light-out surface, the light-in surface is connected to the positioning station, and the side surface is configured to fit a housing of a mobile terminal; and a light concentration surface disposed on a side of the positioning station and facing towards the infrared light transmitter to receive infrared light transmitted by the infrared light transmitter, the light concentration surface comprising a concave curved surface that is optically coupled to the light-in surface, the concave curved surface comprising a middle part of the concave curved surface that is curved into the positioning station toward the infrared light transmitter relative to an edge of the concave curved surface, the light-out surface being a smooth arc-shaped surface that is convex in a direction from the positioning station to the fixing post.

11. The mobile terminal according to claim 10, wherein the fixing post is cylindrical and has a first central axis, the light concentration surface is centrally symmetric and has a second central axis, and the first central axis, the second central axis, and a symmetric axis of the infrared light transmitter in a light-out direction are collinear.

12. The mobile terminal according to claim 11, wherein an area of the light concentration surface is a first area, a cross-sectional area that is of the fixing post and that is in a direction perpendicular to the first central axis is a second area, and the first area is greater than the second area.

13. The mobile terminal according to claim 10, wherein the light concentration surface comprises a plurality of peaks with different curvatures and a plurality of valleys with different curvatures, and the plurality of peaks and the plurality of valleys are connected alternately and smoothly, to form a wavy curved surface.

14. The mobile terminal according to claim 10, wherein the light cover is made of acrylic material.

15. The mobile terminal according to claim 10, wherein a positioning surface is formed on a side that is of the positioning station and that is close to the fixing post, and the positioning surface is disposed to encircle the fixing post to press against the housing.

16. The mobile terminal according to claim 15, wherein a plurality of cushions are disposed on the positioning surface, and the plurality of cushions are evenly distributed around the fixing post.

17. The mobile terminal according to claim 15, wherein a groove is formed in a junction between the positioning surface and the side surface.

18. The mobile terminal according to claim 10, wherein the infrared light transmit apparatus further comprises a drive circuit, and the drive circuit is electrically connected to the infrared light transmitter to supply power to the infrared light transmitter.

19. An electronic equipment comprising:
a housing;
a printed circuit board disposed in the housing;
an infrared light transmitter configured to emit infrared light and being attached to the printed circuit board; and
a light cover extending through a hole in the housing and being aligned with the infrared light transmitter, the light cover comprising a fixing post and a positioning station that are connected to each other;
wherein:
the fixing post comprises a major outer surface for emitting the infrared light and disposed within the hole, the fixing post having a first central axis, a first area of the fixing post being a cross-sectional area of the fixing post in a direction perpendicular to the first central axis;
the positioning station comprises a wavy curved surface for receiving the infrared light from the infrared light transmitter and is configured to position the fixing post relative to the infrared light transmitter; and the wavy curved surface is centrally symmetric, has a second central axis, and has a second area, the second area of the wavy curved surface being an area of a region encircled by edges of the wavy curved surface, the first central axis, the second central axis, and a symmetric axis of the infrared light transmitter in a light-out direction being collinear, the second area of the wavy curved surface being greater than the first area of the fixing post.

20. The electronic equipment according to claim 19, wherein the wavy curved surface comprises a plurality of peaks with different curvatures and a plurality of valleys with different curvatures, and the plurality of peaks and the plurality of valleys are connected alternately and smoothly to form the wavy curved surface.

\* \* \* \* \*